(12) United States Patent
Forbes et al.

(10) Patent No.: US 7,597,614 B2
(45) Date of Patent: Oct. 6, 2009

(54) BIG GAME ANIMAL FIELD DRESSING TOOL AND METHOD

(75) Inventors: David R. Forbes, Cedar Rapids, IA (US); Ron M. Bean, Cedar Rapids, IA (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 0 days.

(21) Appl. No.: 11/859,333

(22) Filed: Sep. 21, 2007

(65) Prior Publication Data

US 2009/0081935 A1    Mar. 26, 2009

(51) Int. Cl.
   *A22C 21/06* (2006.01)
(52) U.S. Cl. .................................................. 452/109
(58) Field of Classification Search ............... 452/109, 452/116, 120, 121, 122, 176
   See application file for complete search history.

(56) References Cited

U.S. PATENT DOCUMENTS

| | | | |
|---|---|---|---|
| 391,268 A * | 10/1888 | Parker | ............................ 7/144 |
| 4,253,501 A * | 3/1981 | Ogle | ............................ 141/27 |
| 4,738,060 A | 4/1988 | Marthaler et al. | |
| 5,122,090 A | 6/1992 | van de Nieuwelaar et al. | |
| 5,123,871 A | 6/1992 | van den Nieuwelaar et al. | |
| 5,133,686 A | 7/1992 | van den Nieuwelaar et al. | |
| 5,199,922 A | 4/1993 | Korenberg et al. | |
| 5,217,194 A | 6/1993 | Brownell | |
| 5,396,743 A | 3/1995 | Bellette | |
| 5,564,232 A | 10/1996 | Callaway | |
| 5,688,164 A | 11/1997 | Mills et al. | |
| 5,740,827 A | 4/1998 | Swarringim | |
| 6,210,263 B1 | 4/2001 | Meyer | |
| 6,244,949 B1 | 6/2001 | Moody | |
| 6,895,613 B1 | 5/2005 | Clouston | |
| D539,868 S | 4/2007 | Luster | |
| 7,367,877 B1 * | 5/2008 | Luster | ........................ 452/102 |
| 7,371,226 B2 * | 5/2008 | Huang | ........................ 604/110 |

* cited by examiner

*Primary Examiner*—Thomas Price
(74) *Attorney, Agent, or Firm*—McKee, Voorhees & Sease, P.L.C.

(57) ABSTRACT

A field dressing tool for big game animals and a method for using same is disclosed. The tool includes a tip portion, a plurality of barbs extending radially and rearwardly from the tip portion, a shank extending from a rear portion of the barbs, and the handle on the shank opposite the tip portion. A barrier member is provided between the tip portion and the handle, and is positioned in a spaced-apart relationship with the handle. Inserting the tip and barbs into the rectum causes radial stretching of the intestinal wall, and rotation of the tool causes ensnarement of the rectum on the barbs. The tool is retracted from the anus, pulling a section of rectum external to the animal to be closed to prevent leakage of bodily waste materials.

25 Claims, 6 Drawing Sheets

BIG GAME ANIMAL FIELD DRESSING TOOL AND METHOD

FIELD OF THE INVENTION

The present invention relates to the field of tools and methods for dressing big game animals in the field.

BACKGROUND OF THE INVENTION

In the sport of hunting big game animals, such as deer, the hunter will often field dress the animal after the kill. Field dressing refers to removing the animal's entrails. If the hunter intends to harvest the meat from the animal, it is important to field dress the animal as soon as possible after the kill to ensure rapid loss of body heat, prevent surface bacteria from growing, and maintain the overall quality of the meat.

A particular problem in field dressing big game animals is in the area of the anus, where the rectal portion of the lower intestine connects to the outer skin of the animal. The traditional method of dealing with this area is to cut around the anus with a knife to separate the anus and the rectum from the skin. The skin is then slit along the lower abdomen to open the body. This process presents the problem of damaging the intestinal wall, thereby allowing solid waste matter to enter the body cavity. When this happens, the meat that is contacted by the bodily waste material becomes contaminated and is not fit for consumption. In addition, the process of cutting around and separating the anus from the surrounding skin with a knife is difficult and time consuming.

One apparatus for cleanly removing the anus and extracting the rectum for safely tying and securing to prevent contaminating leakage of solid waste is disclosed in U.S. D539,868 to Luster. The Luster invention (also shown in FIGS. 1 and 2 of the present disclosure) includes a tool having a forwardly protruding tip portion surrounded by a set of barbs that extend radially beyond the tip. The tip and barbs are mounted to the distal end of the shank that has the handle mounted at its proximal end. To use the tool, the tip is inserted into the anus of the slain animal as the handle is pushed to move the barbs into the body cavity. Once the barbs are beyond the anus, the handle is rotated sufficiently to cause the exposed points of the barbs to ensnare the wall of the rectum. The handle is then pulled back to remove the barbs and the tip of the tool from the body cavity of the animal, extracting a length of the intestine. The exposed intestine is tied or clamped to prevent accidental spilling of bodily waste materials during the balance of the field dressing process.

The Luster invention constitutes a significant improvement over the state of the art. However, depending upon the length of the tool, the tip portion and barbs may be inserted too far into the intestine. In addition, when pushing the tool against the body cavity of the animal, its important to keep the handle pushed tight against the body, to allow proper use and function of the tool. It becomes difficult to turn the handle with user's finger tips while keeping the tool tight against the cavity.

Another potential problem is that if the tool is fully inserted into the intestine of the animal, the user's hand that grips the handle will be in contact with the deer around the anus. This not only makes the tool more difficult to use and control, but runs the risk of contamination and spread of disease if the hunter is not wearing suitable gloves.

Therefore, it is a primary object, feature, or advantage of the present invention to improve upon the state of the art.

It is a further object, feature, or advantage of the present invention to provide a field dressing tool that prevents the tip portion and barbs from being inserted too far inside the intestine of the animal.

Another object, feature, or advantage of the present invention is to provide a field dressing tool that is easy to use and avoids the user's hands coming into contact with the animal around the anus of the animal.

A still further object, feature, or advantage of the present invention is to provide an improved method of field dressing a big game animal that does not unnecessarily damage the intestinal wall of the animal.

Yet another object, feature, or advantage of the present invention is to provide a method of field dressing a big game animal that avoids the risk of contamination and spread of disease when a hunter's hand comes into contact with a slain animal.

Another object, feature, or advantage of the present invention is to provide an improved tool for field dressing a big game animal that is efficient in operation, economical to manufacture, and durable in use.

One or more of these and/or other objects, features, and advantages of the present invention will become apparent from the specification and claims that follow. These objects, features, or advantages of the present invention do not limit the invention, as the present invention can provide other features and advantages in different embodiments and in different contexts.

BRIEF SUMMARY OF THE INVENTION

According to one aspect of the present invention, an improved field dressing tool is provided. The tool generally includes a tip portion, a plurality of barbs extending radially and rearwardly from the tip portion, a shank extending from a rear portion of the barbs, a handle on the shank opposite the tip portion, and a barrier member extending from the shank between the tip portion and the handle and spaced apart from the handle. The barrier member effectively acts as a stop to limit the length of the tool that can be inserted into the intestine of the slain animal. Because the barrier member is also spaced apart from the handle, it provides a space to accommodate the user's hand while gripping the handle of the tool and may prevent the user's hand from directly contacting the animal around the anus. The design also allows the user to firmly grip the handle while keeping the barrier member snug against the animal, giving the user greater control of the field dressing tool.

According to another aspect of the present invention, a method for field dressing a big game animal is provided. The tip portion and barbs of a field dressing tool are inserted into the rectum of the animal so that the barbs cause the rectum to stretch radially. A barrier member on the tool remains on the outside of the animal and limits the length of the tool that can be inserted into the rectum. The handle of the tool is rotated, which causes the barbs to ensnare the rectum. The barbs and tip portion of the tool are then retracted from the animal to extend the portion of the rectum which is then closed to prevent the leakage of waste therefrom.

BRIEF DESCRIPTION OF THE DRAWINGS

While the specification concludes with claims that particularly point out and distinctly claim the invention, it is believed that the present invention will be better understood from the following exemplary description taken in conjunction with the accompanying drawings in which:

DETAILED DESCRIPTION OF THE PREFERRED EMBODIMENT

The present invention will be described as it applies to its preferred embodiment. It is not intended that the present invention be limited to the described embodiment. It is intended that the invention cover all modifications and alternatives which may be included within the spirit and scope of the invention.

Figure 1:
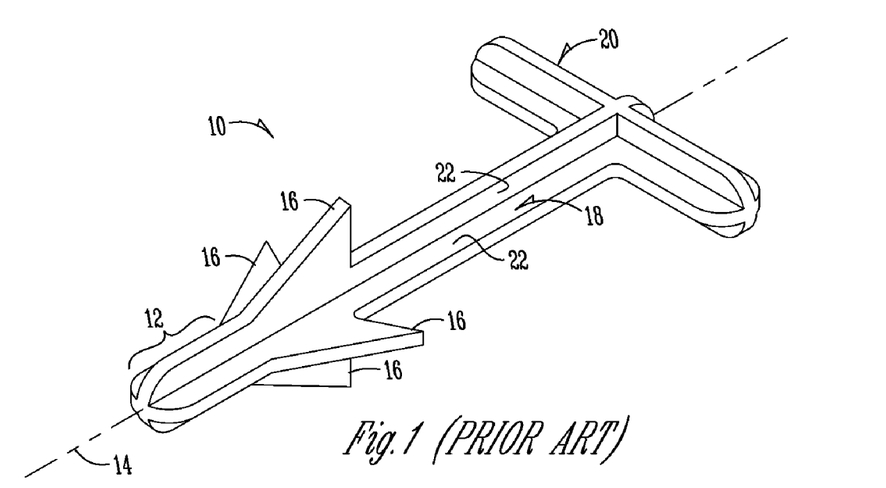
FIG. 1 is a perspective view of a prior art field dressing tool.
Figure 2:
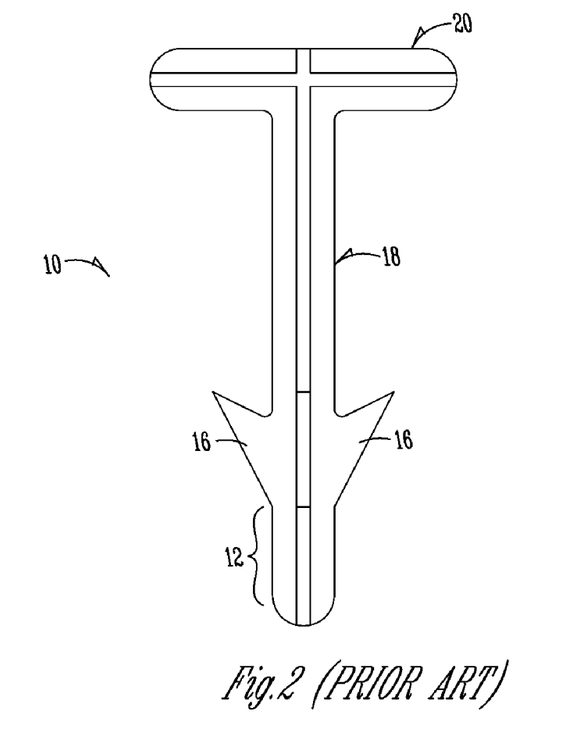
FIG. 2 is a front elevation view of the prior art field dressing tool in FIG. 1.

The present invention includes an improvement to the prior art field dressing tool 10 as shown in FIGS. 1 and 2. The tool 10 is formed about axis 14. Tool 10 has a tip 12 at a first end thereof that is distal from a handle 20. A series of substantially triangular barbs 16 are formed in angularly dispersed portions around tip 12 to extend radially outwardly from the rear portion of tip 12. As in FIG. 1, the tool 10 is formed with four barbs 16, although different numbers of barbs can be used. The tip 12 has a diameter, and the barbs 16 extend in opposite sides of the axes 14 to a width that is greater than the diameter. The diameter of the tip 12 should be sized for being inserted into the anus of a slain animal, such as a deer. The barbs 16 having a width at least twice as great as the diameter of the tip 12 has been found suitable.

A shank 18 is substantially a coaxial extension of tip 12 along the axis 14. The shank 18 terminates in the handle 20 that is formed transverse to the axis 14. The shank 18 is formed substantially long to allow insertion of the tip 12 and barbs 16 into the anus of the animal by at least 3-4 inches while the handle 20 is being held by the user outside the body of the animal. As shown in the figures, the shank 18 and tip portion 12 are formed as an orthogonal cross of ribs 22 and connects at its proximal end to the handle 20, formed in cross section (not shown) in the form of the letter "H". The handle 20 can also be a linear extension of the shank 18. As an alternative, the tip portion 12 can take on a generally hemispherical shape.

To field dress an animal, the tip 12 is inserted into the anus of the animal as the handle 20 is pushed to move the barbs 16 into the body cavity. Once the barbs 16 are beyond the anus, the handle is rotated sufficiently to cause the exposed points of the barbs 16 to ensnare the wall of the rectum. The handle 20 is then pulled back to remove the barbs 16 and the tip 12 of the tool 10 from the body cavity of the animal, thereby extracting a portion of the intestine. The exposed portion of the intestine is then tied or clamped to prevent accidental spilling of body waste materials.

Figure 3:
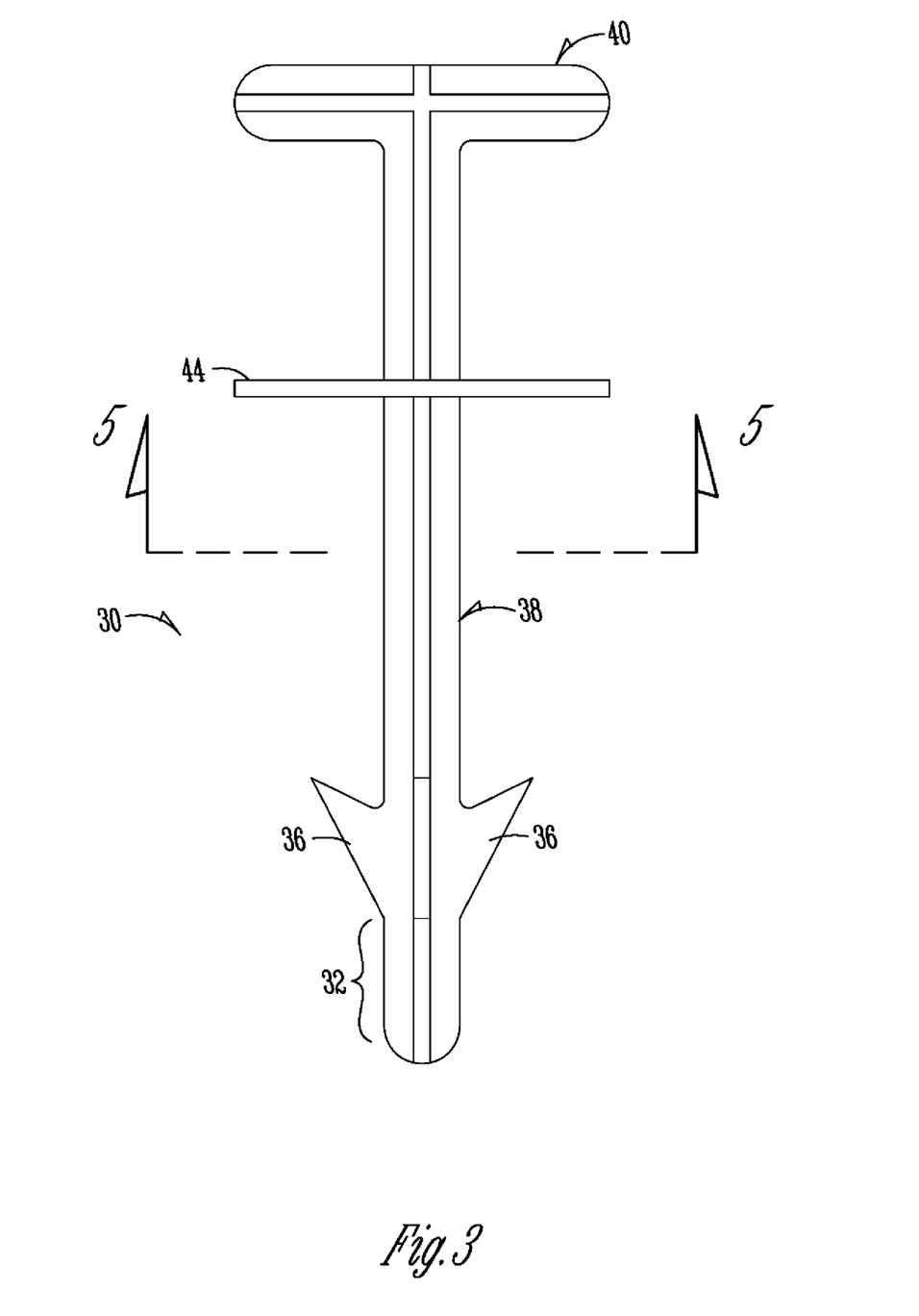
FIG. 3 is a front elevation view of a preferred embodiment of the field dressing tool of the present invention.
Figure 4:
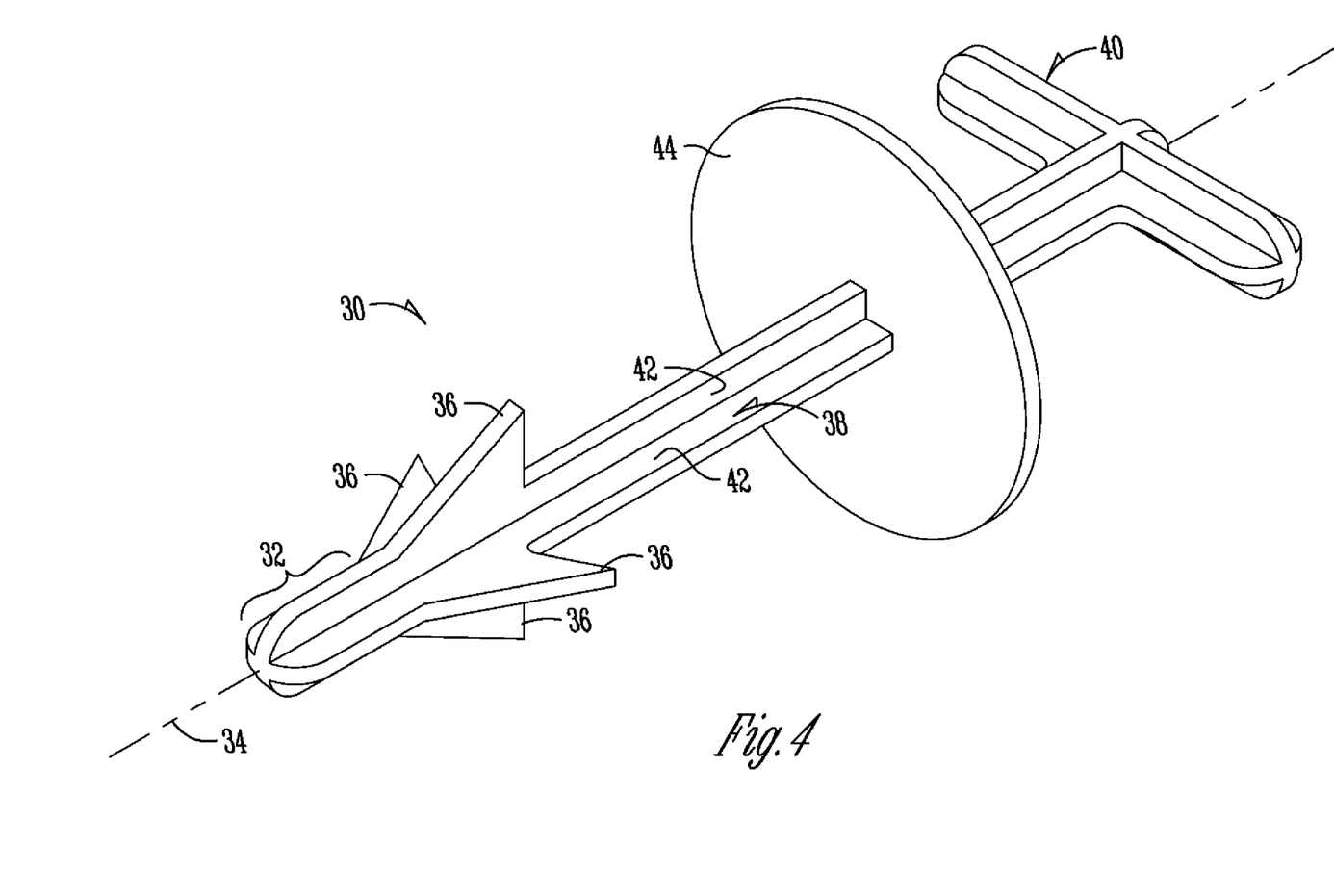
FIG. 4 is a perspective view of the field dressing tool shown in FIG. 3.
Figure 5:
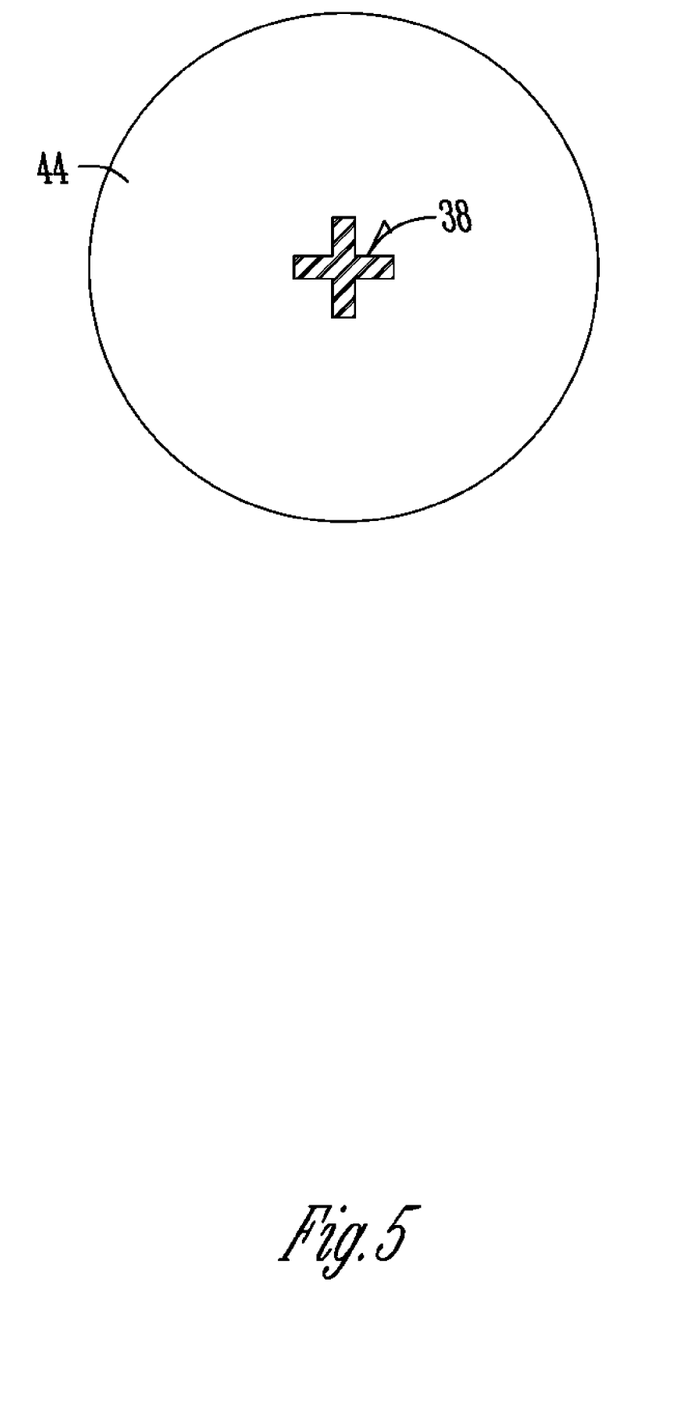
FIG. 5 is a cross sectional view of the embodiment taken in the direction of line 5-5 of FIG. 3.
Figure 6:
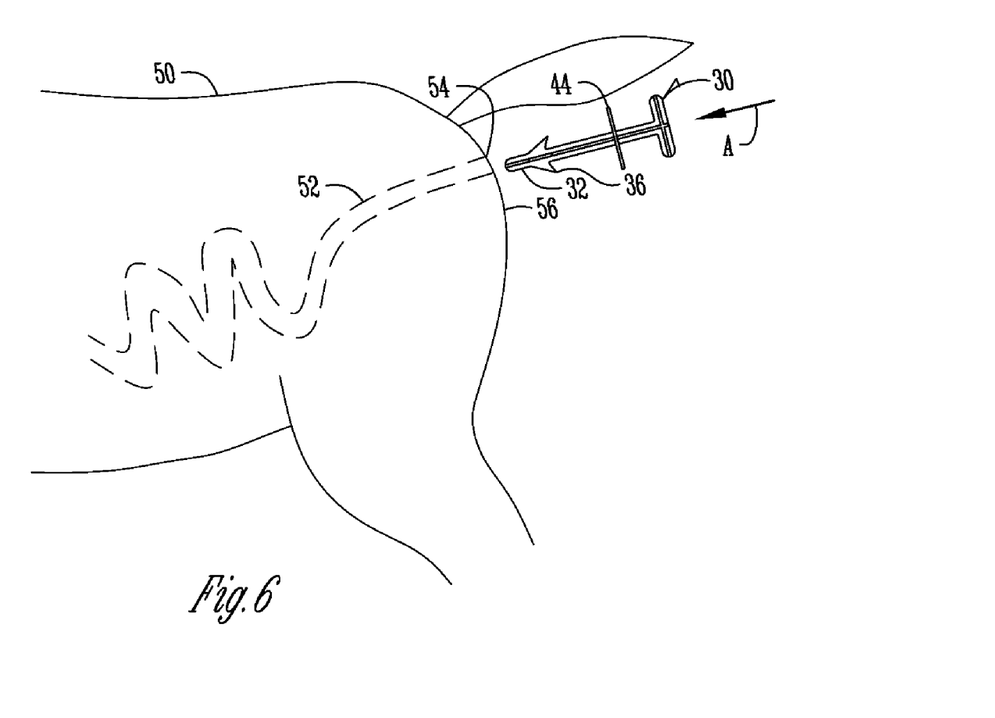
FIG. 6 is a side elevation view of the rear portion of a slain game animal with the preferred embodiment of the present invention tool positioned for use.

The improved tool for field dressing big game animals will now be described. The structure of the tool 30 is illustrated in FIGS. 3-5. Similar to the prior art tool 10 previously described, the tool 30 of the present invention is formed on an axis 34 and includes a tip portion 32 that is distal from a handle 40. The tip portion 32 can also have a generally hemispherical shape. Triangular barbs 36 are disposed around the tip 32 and extend radially outwardly from the rear portion of tip 32. A shank 38 extends from the tip portion 32 along the axes 34. The shank 38 terminates in the handle 40 that is formed transverse to the axes 34. The shank 38 and handle 40 are formed on an orthogonal cross of ribs 42.

As compared with the prior art tool 10, the tool 30 of the present invention is longer in length and includes a barrier member 44 that extends away from the shank and is disposed between the opposite ends of the tool 30. It is preferred that the barrier member 44 maintain a spaced-apart relationship with the handle 40 to allow the user's hand to comfortably fit between the handle 40 and the barrier member 44 while gripping the handle 40. It is also preferred that the barrier member be positioned sufficiently rearward of the tip 32 and barbs 36 so that the tool can be inserted into the anus of the slain animal by approximately 3-6 inches while the handle is being held by the user outside the body of the animal. The barrier member 44 as shown is generally perpendicular to the shank 38 and has a planer surface extending therefrom. Those skilled in the art will appreciate that similar configurations at different angles and with some curvature could be used. The barrier member 44 acts as a stop to limit the length of the tool that can be inserted into the anus of the animal. In addition, the user can firmly grip the handle 40 while keeping the barrier member 44 snug against the animal, which gives the user greater control over the tool 30.

Those skilled in the art will appreciate that the barrier member can take various shapes and forms. The preferred embodiment shows a barrier member 44 that is an annular flange having a diameter approximately 3:2 times greater than the diameter or width of the shank 38. However, the barrier member could take on other shapes and need not be a continuous structure. Important to the present invention is that the barrier member effectively limit the length of the tool 30 that is inserted into the anus of the animal. In its preferred form, the tool 30 as designed for field dressing deer has a length of approximately 8 inches with the barrier member 44 disposed 2 inches from the handle 40.

It is preferred that the tool 30 is manufactured by an injection molding process and that all of the parts of the tool are integrally formed, with the choice of plastics resin to be determined by the manufacturer.

Figure 7:
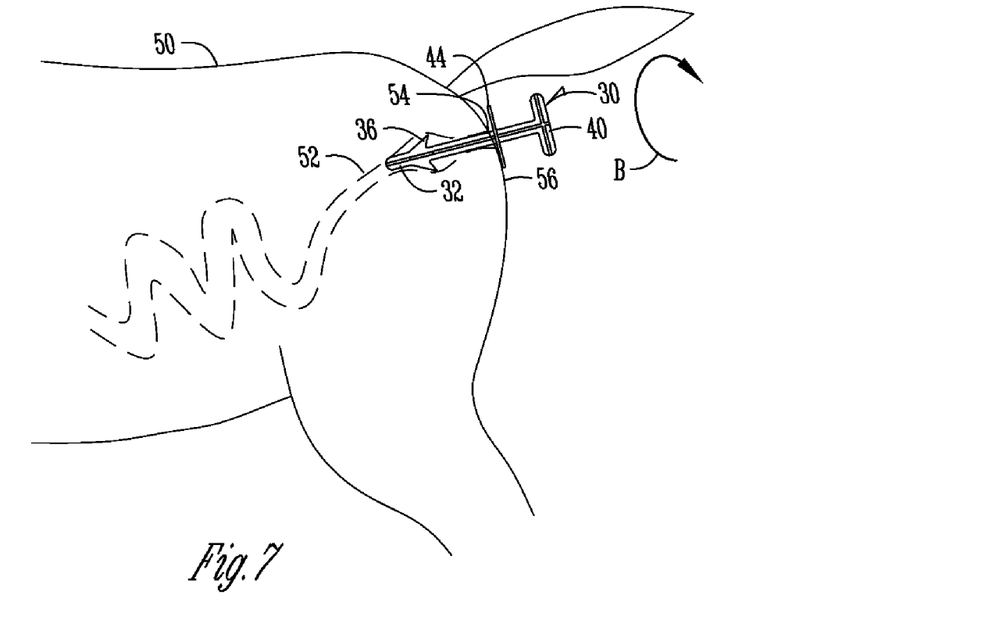
FIG. 7 is a view of FIG. 6 with the tool inserted into the anus of the slain animal.

The method of using the field dressing tool 30 will now be illustrated with reference to FIGS. 6-9, which are side elevation views of the rear portion of a large game animal, here a deer 50. Each of the figures show select internal organs depicted in dashed lines. The animal's rectum 52, which is the last section of the intestine, connects to the anus 54 at the animal's rump 56. The internal end of the rectum 52 continues as intestines that ultimately terminate at the stomach (not shown). The field dressing tool 30 is positioned in FIG. 6 in alignment with anus 54 with the tip 32 adjacent to the anus 54. The tool 30 is to be pushed in the direction indicated by arrow A until the tip 32 and barbs 36 have passed the anus 54 and entered the rectum 52 in the position as shown in FIG. 7. When the tool 30 is fully inserted into the rectum 52, the barrier member 44 abuts the rump 56 of the deer 50 at the anus 54. The barrier member effectively limits how far the tip portion 32 and barbs 36 can be inserted into the rectum 52. This avoids causing unnecessary damage to the wall of the intestines. The barrier member 44 also maintains a spaced-apart relationship with the handle 40, which allows the user to comfortably maintain a grip on and control over the tool 30. It also avoids direct contact between the user's hand and the anus 54.

As shown in FIG. 7, rectum 52 is stretched radially to accommodate and engage barbs 36 therein. The barrier member 44 limits the length of the tool 30 that can be inserted through the anus 54 and into the rectum 52.

The tool 30 is next rotated as indicated by arrow B through an angle of approximately 180°. Because the barbs 36 are formed along a series of perpendicular planes that pass through the axis 34 of the tool 30, rotation of the tool 30 can be either in a clockwise or counterclockwise direction. With the extended sharp points of the barbs 36 stretched over the membrane comprising the rectum 52, rotation of the tool 30 causes the barbs 36 to dig into and ensnare the wall of the rectum 52.

Figure 8:
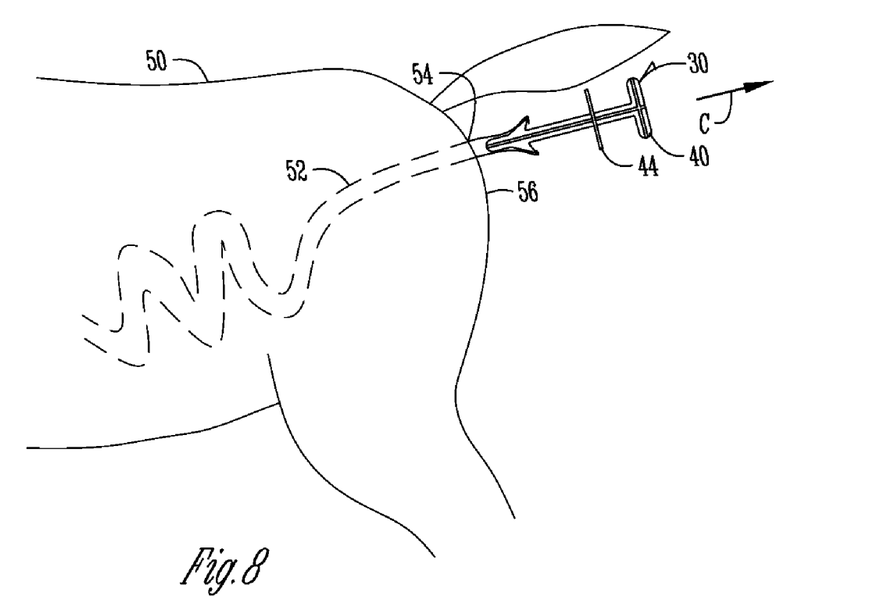
FIG. 8 is a view of FIG. 7 with the tool withdrawn from the anus of the slain animal with a portion of the animal's rectum.

Now referring to FIG. 8, the tool 30 is withdrawn in the direction indicated by arrow C from the animal's anus 54, drawing a section of the rectum 52 outside of the anus 54. To provide ample space to tie or clamp the end of the rectum 52, the tool 30 is pulled out of the anus 54 by approximately 10-12 inches. The tool 30 is then removed from the rectum 52 by cutting the intestinal wall either before or after the clamping or tying is done, as described below.

Figure 9:
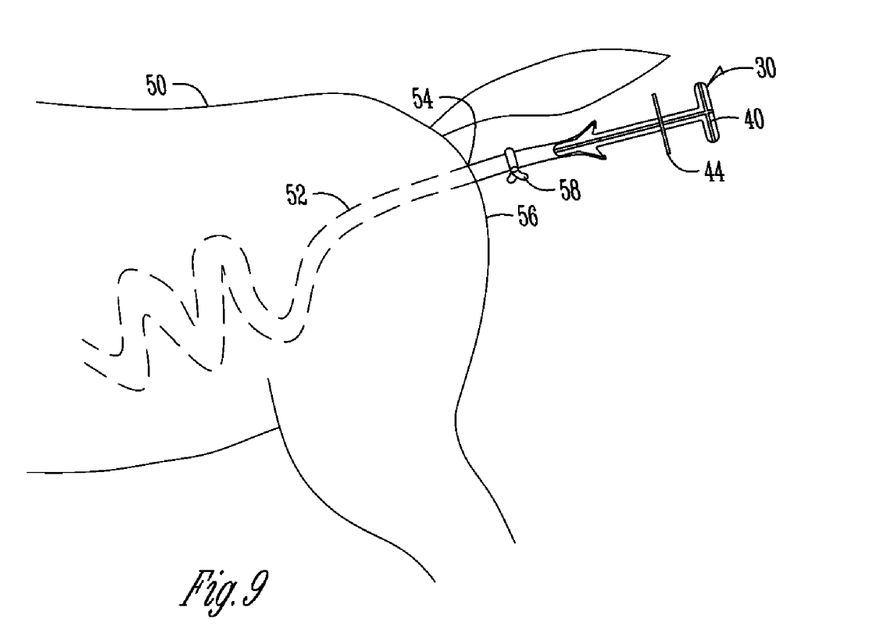
FIG. 9 is a view of FIG. 8 with the tool holding a section of withdrawn and tied rectum of the slain animal.

As shown in FIG. 9, the extended section of the rectum 52 is tied into a knot 58. As an alternative, a clamp (not shown) is applied and pulled tight enough to prevent solid waste from escaping through the rectum 52 during the remaining field dressing process. Twisting the rectum 52 outside the body cavity of the animal prior to clamping serves to further prevent waste leakage.

Once the intestines are tied or clamped to prevent waste leakage, the field dressing process continues. The extended section of the rectum 52 is repositioned in the body cavity either by pushing the extended section through the anus 54 or pulling the extended section from within the body cavity after the cavity has been opened. The intestines and the balance of the digestive track are then removed through the abdominal opening along with the urinary track.

The present invention contemplates numerous additions, alternatives, and options. That which has been disclosed is merely exemplary. The present invention is not to be limited to or by the specific embodiment disclosed herein. The invention is only to be limited by the claims appended hereto.

What is claimed is:

1. A method for field dressing a slain big game animal having a body cavity that helps prevent accidental spilling of waste matter into the body cavity, the method comprising:
   providing a field dressing tool including a tip portion, a plurality of barbs extending radially and rearwardly from the tip portion, a shank extending from a rear portion of the barbs, a handle on the shank opposite the tip portion, and a barrier member extending radially from the shank between the tip portion and the handle and in a spaced-apart relationship with the handle such that the barrier member isolates the handle from the rectum;
   inserting the tip portion and the barbs into the rectum of the animal so that the barrier member is adjacent the animal outside of the rectum thereby assisting in isolating the handle from the rectum to avoid contact with bodily fluids and placing the barbs at a set depth and the barbs cause the rectum to stretch radially;
   rotating the handle to cause the barbs to ensnare the rectum;
   retracting the barbs and tip portion from the animal to extend a portion of the rectum; and
   closing the extended portion of the rectum to prevent the leakage of waste therefrom.

2. The method of claim 1 wherein the step of closing the extended portion of the rectum comprises tying the extended portion of the rectum.

3. The method of claim 1 wherein the step of closing the extended portion of the rectum comprises clamping the extended portion of the rectum.

4. The method of claim 1 further comprising the step of twisting the extended portion of the rectum after retracting the barbs and tip portion from the animal and prior to closing.

5. The method of claim 1 wherein the barrier member includes a generally planar surface.

6. The method of claim 1 wherein the barrier member comprises a flange extending radially outwardly from the shank beyond the plurality of barbs.

7. The method of claim 6 wherein the flange is an annular flange.

8. The method of claim 1 wherein the tip portion, the plurality of barbs, the shank, the handle and the barrier member are integrally formed.

9. A method for using a big game field dressing tool comprising a tip portion, a plurality of barbs extending radially and rearwardly from the tip portion, a shank extending from a rear portion of the barbs, a handle on the shank opposite the tip portion, and a barrier member extending from the shank between the tip portion and the handle and in a spaced-apart relationship with the handle, the method comprising:
   inserting the tip portion and the barbs into the rectum of a slain animal so that the barrier member is adjacent the animal outside of the rectum to thereby limit a distance the tip portion is inserted into the rectum and to isolate the handle from the rectum and the barbs cause the rectum to stretch radially;
   rotating the handle to cause the barbs to ensnare the rectum;
   retracting the barbs and tip portion from the animal to extend a portion of the rectum; and
   closing the extended portion of the rectum to prevent the leakage of waste therefrom.

10. The method of claim 9 wherein the step of rotating the handle comprises rotating the handle through an angle of approximately 180°.

11. The method of claim 9 wherein the step of closing the extended portion of the rectum comprises tying the extended portion of the rectum.

12. The method of claim 9 wherein the step of closing the extended portion of the rectum comprises clamping the extended portion of the rectum.

13. The method of claim 9 further comprising the step of twisting the extended portion of rectum after retracting the barbs and tip portion from the animal and prior to closing.

14. The method of claim 9 wherein the barrier member is an annular flange extending radially from the shank beyond the plurality of barbs.

15. A tool for dressing big game in the field, comprising:
   a forwardly extending tip portion having a distal end configured for insertion into the anus of an animal and a proximal end spaced from the distal end;
   a plurality of barbs affixed to the proximal end of the tip portion and extending radially and rearwardly from the tip portion;
   an elongate shank affixed to a rear portion of the barbs and sized to permit a portion of each barb to extend radially beyond the shank;
   a handle fixedly mounted to a rear portion of the shank so that movement of the handle results in substantially equal movement of the tip portion, barbs and shank; and a barrier member extending from the shank between the tip portion and the handle and in a spaced-apart relationship with the handle, the barrier member adapted to limit a distance the tip portion is inserted into an animal and to isolate the handle from the animal.

16. The tool for dressing big game in the field of claim 15 wherein the barrier member includes a generally planar surface.

17. The tool for dressing big game in the field of claim 15 wherein the barrier member comprises a flange extending radially outwardly from the shank beyond the plurality of barbs.

18. The tool for dressing big game in the field of claim 17 wherein the flange is an annular flange.

19. The method of claim 15 wherein the tip portion, the plurality of barbs, the shank, the handle and the barrier member are integrally formed.

20. The tool for dressing big game in the field as described in claim 15, wherein the plurality of barbs are dispersed substantially equally angularly around the tip portion.

21. The tool for dressing big game in the field as described in claim 15, wherein the plurality of barbs comprises four barbs.

22. The tool for dressing big game in the field as described in claim 15, wherein the handle is formed perpendicular to the shank.

23. The tool for dressing big game in the field as described in claim 15, wherein the shank is formed with orthogonally connected ribs.

24. A tool for dressing big game in the field, comprising:
 a forwardly extending tip portion having a distal end configured for insertion into an anus for an animal and a proximal end spaced from the distal end;
 a plurality of barbs affixed to the proximal end of the tip portion and extending radially and rearwardly from the tip portion;
 an elongated shank affixed to a rear portion of the barbs and sized to permit a portion of each barb to extend radially beyond the shank;
 a handle fixedly mounted to a rear portion of the shank so that movement of the handle results in substantially equal movement of the tip portion, barbs and shank;
 a barrier member extending from the shank between the tip portion and the handle and in a spaced-apart relationship with the handle, the banner member for limiting extent of insertion of the tool into the animal;
 a distance between the barrier member and the tip portion defining an acceptable distance for insertion of the tool into the animal for use of the tool in dressing the animal.

25. A method for field dressing a slain big game animal having a body cavity that helps prevent accidental spilling of waste matter into the body cavity, the method comprising:
 providing a field dressing tool including a tip portion, a plurality of barbs extending radially and rearwardly from the tip portion, a shank extending from a rear portion of the barbs, a handle on the shank opposite the tip portion, and a barrier member extending radially from the shank between the tip portion and the handle and in a spaced-apart relationship with the handle;
 inserting the tip portions and the barbs into the rectum of animal until the barrier stops against the animal at a position outside of the rectum, the insertion of the barbs causing the rectum to stretch radially;
 rotating the handle to cause the barbs to ensnare the rectum;
 retracting the barbs and tip portion from the animal to extend a portion of the rectum; and
 closing the extended portion of the rectum to prevent leakage of waste therefrom.

* * * * *